(12) United States Patent  (10) Patent No.: US 7,142,362 B2
Nakada et al.  (45) Date of Patent: Nov. 28, 2006

(54) OPTICAL ATTENUATOR

(75) Inventors: Hidenori Nakada, Tokyo (JP); Shusuke Wada, Tokyo (JP); Keisuke Ikeda, Tokyo (JP); Yuko Ota, Tokyo (JP)

(73) Assignee: FDK Corporation (JP)

( * ) Notice: Subject to any disclaimer, the term of this patent is extended or adjusted under 35 U.S.C. 154(b) by 252 days.

(21) Appl. No.: 10/969,195

(22) Filed: Sep. 17, 2004

(65) Prior Publication Data

US 2006/0061863 A1 Mar. 23, 2006

(51) Int. Cl.
*G02B 5/30* (2006.01)
*G02B 6/00* (2006.01)

(52) U.S. Cl. .................. 359/495; 359/494; 359/484; 385/11

(58) Field of Classification Search ........... 359/484, 359/281; 372/703
See application file for complete search history.

(56) References Cited

U.S. PATENT DOCUMENTS 5,768,005 A * 6/1998 Cheng et al. ............ 359/281
6,055,104 A * 4/2000 Cheng .................... 359/495
6,226,115 B1 * 5/2001 Shirasaki et al. ........ 359/280
6,480,331 B1 * 11/2002 Cao ......................... 359/484
6,870,675 B1 * 3/2005 Ikeda et al. .............. 359/484

FOREIGN PATENT DOCUMENTS

JP 10-161076 6/1998
JP 2002-258229 9/2002
JP 2003-107420 4/2003

* cited by examiner

*Primary Examiner*—Arnel C. Lavarias
*Assistant Examiner*—Aline D McNaull
(74) *Attorney, Agent, or Firm*—Marger Johnson & McCollom, P.C.

(57) ABSTRACT

A low-cost compact optical attenuator structure has an input port and an output port for optical signals arranged side by side; a reflecting member arranged to face both ports to reverse light from the input side on an optical path folded 180°; a birefringence crystal splits incident light into two polarization components, a converging lens converges the incident light, a fixed Faraday rotator having a variable rotation angle arranged in that order in the optical path. The partial reflecting member that transmits a portion of incident light to the rear side thereof, an optical sensor at the rear side of the reflecting member, optical guide means guide only the transmitted light from the input port side to the optical sensor, and optical detection signals of the optical sensor are used as optical input monitoring signals.

12 Claims, 8 Drawing Sheets

(a)

(b)

(a)

(b)

(a)

(b)

(a)

(b)

OPTICAL ATTENUATOR

FIELD OF THE INVENTION

The present invention is related to an optical attenuator which can vary the attenuation of optical intensity using a Faraday rotator, and in particular to an improvement of monitoring detection of optical input in a reflector which reverses the light from the input side on an optical path folded 180°.

DESCRIPTION OF THE PRIOR ART

As shown in Japanese Laid-Open Patent Application No. 2003-107420 (Patent Document 1), Japanese Laid-Open Patent Application No. 2002-258229 (Patent Document 2) and Japanese Laid-Open Patent Application No. HEI 10-161076 (Patent Document 3), for example, this type of optical attenuator is constructed by combining a Faraday rotator which rotates the polarization plane of incident light, and a birefringence crystal which spatially splits the incident light into two polarizations (ordinary light and extraordinary light), wherein the amount of attenuation of the light can be varied by controlling the light combined at the output port.

This kind of optical attenuator can be used to adjust the signal level of an optical amplifier, wherein the optical intensity is adjusted by the optical attenuator from the need to compensate the gain level which fluctuates dynamically in the optical amplifier. In this adjustment of optical intensity, a comparative reference of an optical intensity is needed at the optical amplifier side, and for this reason the optical intensity inputted in the optical attenuator is monitored, and this is fed back to the optical amplifier side.

In this regard, the feed back of the optical attenuator can be carried out by the structure shown in FIG. 1, for example. Namely, as shown in FIG. 1, a beam splitter 101 which reflects a portion of light is arranged at the input side of an optical attenuator 100 at a roughly 45° incline with respect to the optical axis. In this way, because the optical path is changed by roughly 90°, the reflected light reflected by the surface of the beam splitter 101 is guided toward the side where it is converged by a converging lens 102 onto an optical sensor 103. Then, the optical detection signals detected by the optical sensor 103 are outputted to an optical amplifier omitted from the drawing. This kind of optical intensity monitoring function may be constructed in a separate body from the optical attenuator 100, or it may be integrally constructed in one case together with the optical attenuator 100.

However, in accordance with this optical intensity monitoring function, because the light guiding direction is in a side direction changed roughly 90° from the optical axis, a portion of the optical sensor 103 projects to the side, and this creates the problem that it becomes impossible to avoid constructing a large-scale system.

SUMMARY OF THE INVENTION

In view of the background described above, it is an object of the present invention to overcome the problems of the prior art described above by providing an optical attenuator which can be made compact with a relatively simple structure at low cost, and which is equipped with a monitoring function that detects optical intensity.

In order to achieve the object stated above, the optical attenuator according to the present invention is constructed from an input port and an output port for optical signals arranged side by side; a reflecting member arranged to face both of the ports to reverse light from the input side on an optical path folded 180°; a birefringence crystal which splits incident light into two polarization components, a converging lens which converges the incident light, a fixed Faraday rotator having a fixed rotation angle, and a variable Faraday rotator having a variable rotation angle arranged in that order in the optical path; wherein the reflecting member is a partial reflecting member that transmits a portion of the incident light to the rear side thereof, an optical sensor is provided at the rear side of the reflecting member, optical guide means are provided to guide only the transmitted light from the input port side to the optical sensor, and optical detection signals of the optical sensor are used as optical input monitoring signals.

Further, the optical guide means can be formed by roughly aligning the axis of the converging lens with an imaginary axis lying between both optical axes of the input and output ports, forming the rear surface that forms the transmission surface of the reflecting member as an inclined surface, and setting the inclination angle of the inclined surface to direct the transmitted light from the input port side in a direction along the imaginary axis, or in the case where the rear surface that forms the transmission surface of the reflecting member is formed parallel to the reflecting surface thereof, the optical guide means can be formed by roughly aligning the axis of the converging lens with the optical axis of the input port, arranging the reflecting member in an inclined posture with respect to the optical axis of the input port, and setting the inclination angle of the inclined posture to direct transmitted return light from the output port side in an inclined direction with respect to the optical axis of the input port.

Further, a focusing lens which converges the incident light for the purpose of focusing is preferably provided in the optical path leading to the optical sensor. Further, the thickness a of the birefringence crystal in the optical path and the focal length f of the converging lens should preferably obey the relation f>a.

Accordingly, in the present invention, the reflecting member transmits a portion of the incident light to the rear side, and because the optical guide means guide this transmitted light to the optical sensor, the arrangement of the optical sensor can be suitably set, and this makes it possible to arrange the optical sensor at the position forming the rear side of the reflecting member. Namely, the structural element that carries out the light intensity monitoring function can be arranged without protruding in a side direction from the optical path. Further, this structure is easily obtained by giving optical transmittance to the reflecting member without changing the basic structure of an optical attenuator.

Further, the birefringence crystal can be arranged in an inclined posture which is inclined with respect to the emitted light from the input port. Further, the focal length f of the converging lens is preferably within the range 1<f<3.

Further, the birefringence crystal is arranged so that the polarization direction of the extraordinary light is not aligned with the plane that includes the optical axes of both input and output ports, and as much as possible, the birefringence crystal is arranged so that the polarization direction of the extraordinary light perpendicularly intersects the plane that includes the optical axes of both input and output ports.

BRIEF DESCRIPTION OF THE DRAWINGS

FIGS. 2(a) and 2(b) are side views of an optical attenuator showing a first embodiment, wherein FIG. 2(a) shows light moving in sequential directions from the input side to the output side, and FIG. 2(b) shows return light moving in the reverse direction from the output side to the input side.

FIGS. 8(a) and 8(b) are side views of an optical attenuator showing a second embodiment, wherein FIG. 8(a) shows light moving in sequential directions from the input side to the output side, and FIG. 8(b) shows return light moving in the reverse direction from the output side to the input side.

DETAILED DESCRIPTION OF THE PREFERRED EMBODIMENTS

Figure 1:
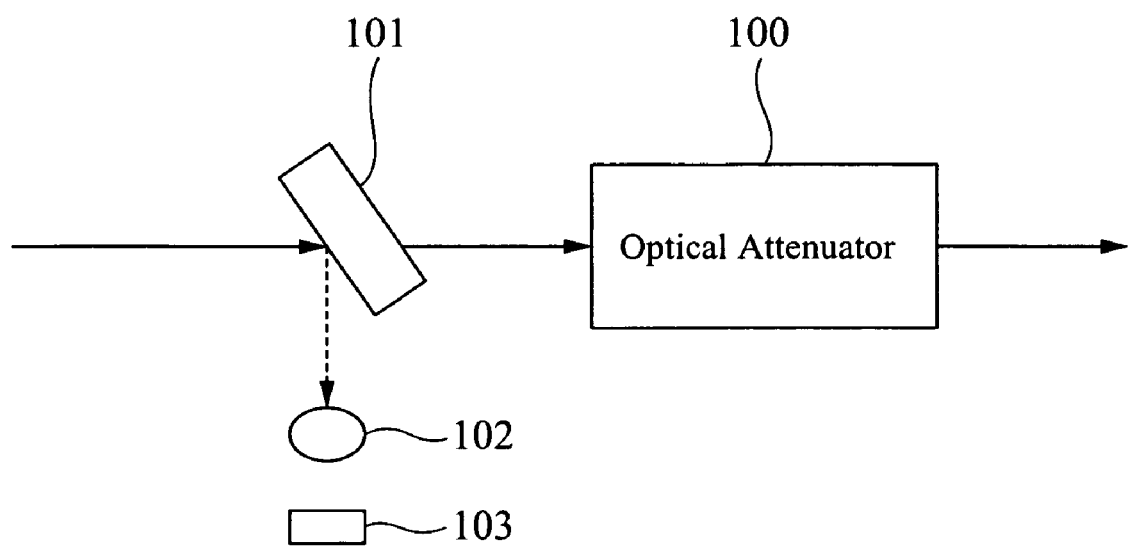
FIG. 1 is a structural diagram showing the optical intensity monitoring function provided in an optical attenuator.
Figure 2:
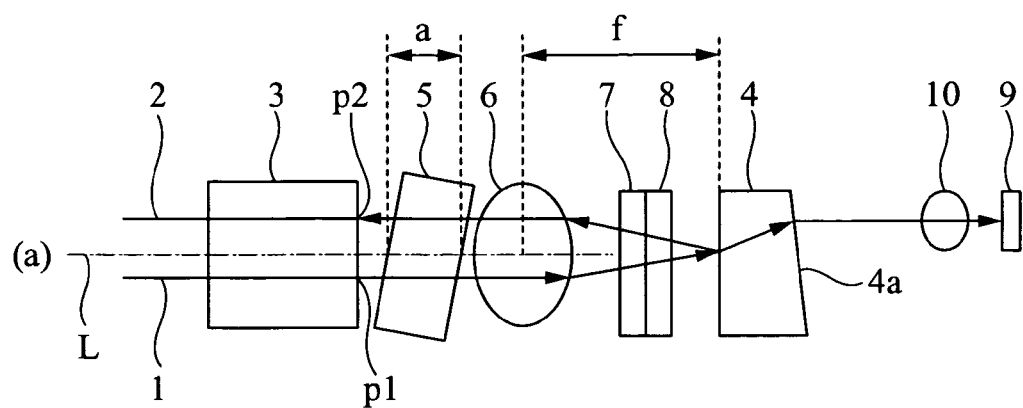
Figure 2:
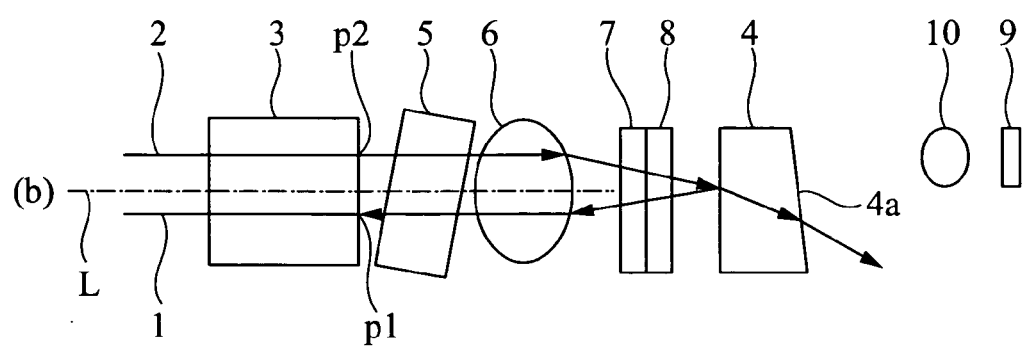
Figure 3:
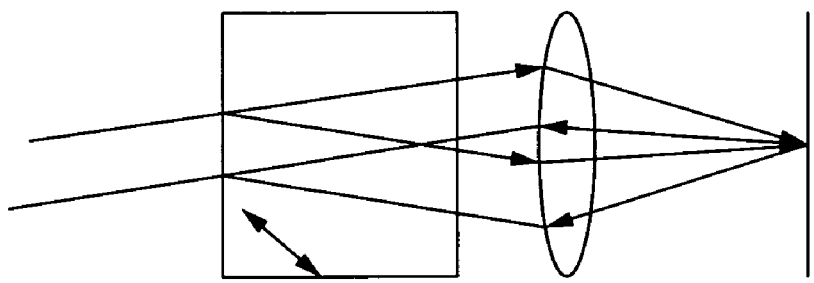
FIGS. 3(a) and 3(b) are side views showing polarization due to the birefringence crystal.
Figure 3:
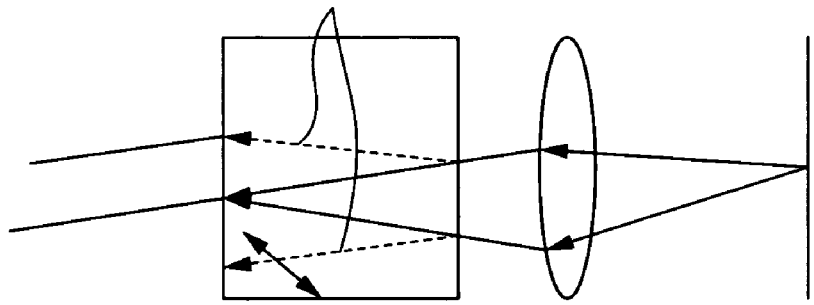

FIGS. 2(a) and 2(b) show a first embodiment of the present invention. In the present embodiment, the optical attenuator has a structure in which an input port p1 and an output port p2 for optical signals are arranged side by side, and the light from the input side is reversed on an optical path folded 180° by a reflecting member 4 facing both ports p1 and p2. Further, a birefringence crystal (also called a birefringence element) 5 which splits the incident light into two polarization components, a converging lens 6 which converges the incident light, a fixed Faraday rotator 7 having a fixed rotation angle, and a variable Faraday rotator 8 having a variable rotation angle are arranged in that order in the optical path. Optical fibers 1 and 2 are respectively connected to the input port p1 and the output port p2, and these are held by a twin core ferrule 3. This basic structure is similar to the invention disclosed in Patent Document 1.

However, in the present invention, the reflecting member 4 is given the characteristic of transmitting a portion of the incident light to the rear side. In other words, the reflecting member 4 can be said to construct a beam splitter, and in particular can be formed by forming a dielectric multilayer film on the surface of a transparent plate material such as a glass plate or the like, for example. In this regard, the optical transmittance of the reflecting member 4 may be set so that 2~5% of the incident light is transmitted, for example.

Further, an optical sensor 9 is provided at the rear side of the reflecting member 4, and optical guide means are provided to guide only the transmitted light from the input port p1 side to the optical sensor 9. Optical detection signals created by the optical sensor 9 are outputted to an optical amplifier omitted from the drawings to form optical input monitoring signals.

In the present embodiment, the axis of the converging lens 6 is arranged to be roughly aligned with an imaginary axis L lying between both input and output ports p1 and p2, and the optical guide means includes an inclined surface 4a formed on the rear surface of the reflecting member 4, wherein the inclination angle of the inclined surface 4a is set so that the light transmitted from the import port p1 side is directed in a direction along (parallel to) the imaginary axis L. Further, the optical sensor 9 is arranged at the position receiving this transmitted light, and a focusing lens 10 for converging the incident light for the purpose of focusing is provided in the light path leading to the optical sensor 9.

The birefringence crystal 5 is arranged in a prescribed inclined posture which is inclined toward the incident light from the input port p1. At this time the birefringence crystal 5 is set so that the polarization direction of the extraordinary light is not aligned with the plane that includes the optical axes of both input and output ports p1 and p2. Further, in this arrangement, the polarization direction of the extraordinary light is set to perpendicularly intersect the plane that includes the optical axes of both input and output ports p1 and p2.

By setting the polarization direction of the extraordinary light in the birefringence crystal 5 as described above for the input and output ports p1 and p2, the separation plane of the ordinary light and the extraordinary light is set so as to be not aligned with the plane that includes the optical axes of both input and output ports p1 and p2, and in this way the recombination of noise components is prevented. Namely, because the polarization direction of the extraordinary light in the birefringence crystal 5 forms the separation plane of the ordinary light and the extraordinary light, when this separation plane is aligned with the plane at the side of the port optical axes, a portion of the light (noise component) refracted for controlling attenuation returns to the output port p2. However, in the present embodiment, because the separation plane of the extraordinary light is set to perpendicularly intersect the plane at the side of the port optical axes, it is possible to prevent the recombination of such noise components.

Further, the thickness a of the birefringence crystal 5 in the optical path, and the focal length f of the converging lens 6 are set to obey the relation f>a, wherein the focal length f of the converging lens 6 has values within the range 1<f<3.

As shown in FIG. 2(a), the incident light from the input port p1 passes through the birefringence crystal 5, the converging lens 6, and the two Faraday rotators 7 and 8, and is reflected by the surface of the reflecting member 4 back through the optical elements described above in reverse on an optical path folded 180°, and then this light is combined at the output port p2 by controlling the attenuation which matches the Faraday rotations of the two Faraday rotators 7 and 8 to the birefringence of the birefringence crystal 5. At this time, most of the incident light is reflected by the reflecting member 4 and directed to the output port p2, but one portion of the incident light is transmitted through the reflecting member 4 and passes through the focusing lens 10 to be combined at the optical sensor 9. Accordingly, the light moving in the sequential directions from the input side to the output side is optically detected by the optical sensor 9.

On the other hand, as shown in FIG. 2(b), the return light from the output port p2 side passes through the birefringence crystal 5, the converging lens 6, and the two Faraday rotators 7 and 8 and is reflected by surface of the reflecting member 4, and even though most of these light rays are directed to the input port p1 side, a portion of such light is transmitted through the reflecting member 4. However, this transmitted return light is not combined at the optical sensor 9. Namely, the inclination angle of the rear surface of the reflecting member 4 is set to direct the transmitted light from the input port p1 side in a direction along the imaginary axis L, and the optical sensor 9 is arranged at a position to receive this light, but because the return light from the output port p2 side has a different refraction direction at the time of emission, it is impossible for the return light to be combined at the optical sensor 9.

The optical sensor 9 is arranged to combine the transmitted light from the input port p1 side, and in this way avoids combining noise components such as return light and the like from the output port p2 side. It is believed that the sensitivity to noise components such as return light and the like can be lowered by using an optical sensor having a small-size light-receiving surface like that (i.e., the optical sensor 94) shown in FIG. 4(*b*), for example. However, in this kind of arrangement, because the sensitive area of the optical sensor itself is reduced, it is impossible to catch the entire light beam that should originally be detected, and this lowers the conversion efficiency and becomes a problem.

Figure 4:
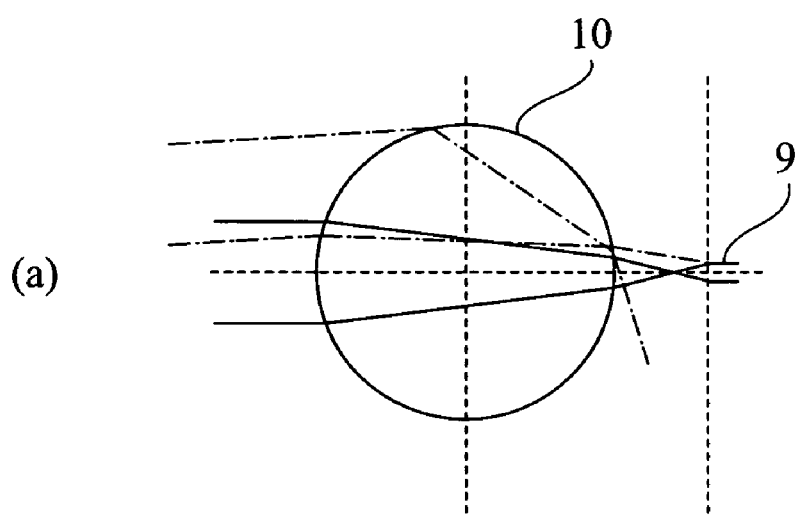
FIGS. 4(a) and 4(b) are side views showing optical detection of ordinary light components by the optical sensor.
Figure 4:
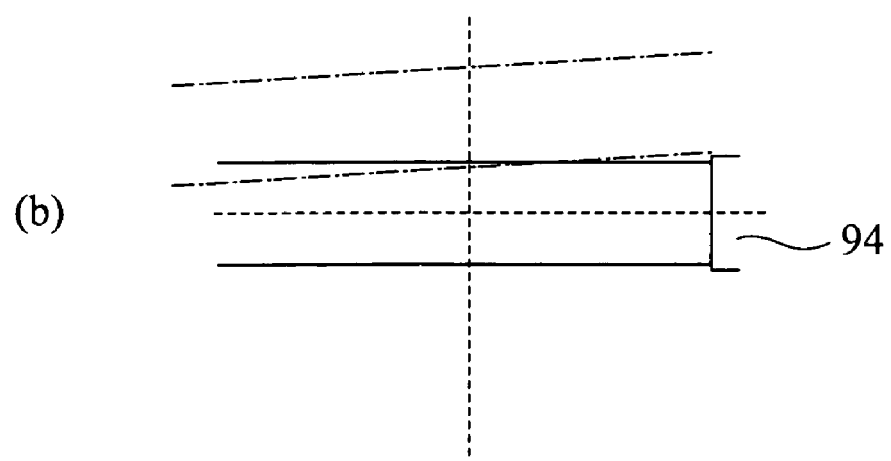

In this regard, as was described above, because the focusing lens 10 is provided in the optical path leading to the optical sensor 9, the light beam can be converged in such optical path as shown in FIG. 4(*a*). For this reason, all of the transmitted light from the input port p1 side can be caught and detected, and there is no lowering of the conversion efficiency. Further, because the diameter of the light beam of the noise components such as return light and the like from the output port p2 side becomes small, such noise components are focused outside the optical sensor 9 to a region outside the detection region. Accordingly, the size of the light-receiving surface of the optical sensor 9 can be made suitably small, and the noise components can be excluded sufficiently without lowering the conversion efficiency.

Figure 5:
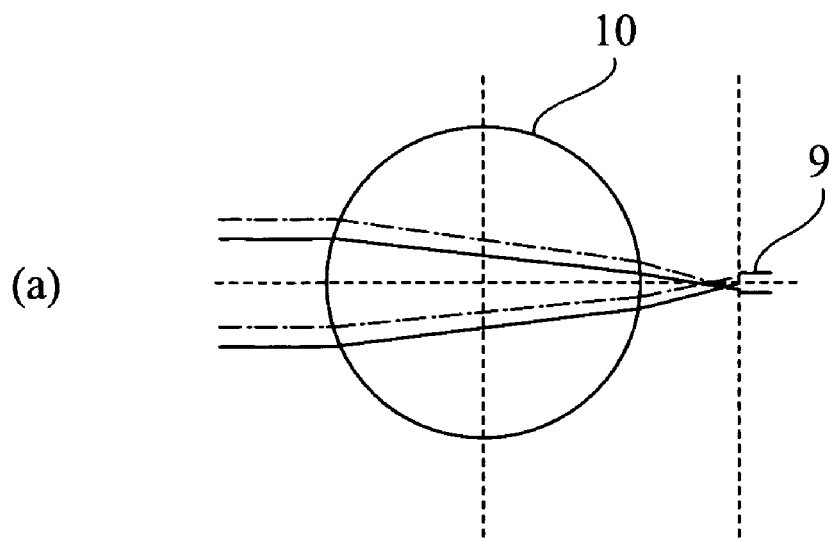
FIGS. 5(a) and 5(b) are side views showing optical detection of extraordinary light components by the optical sensor.
Figure 5:
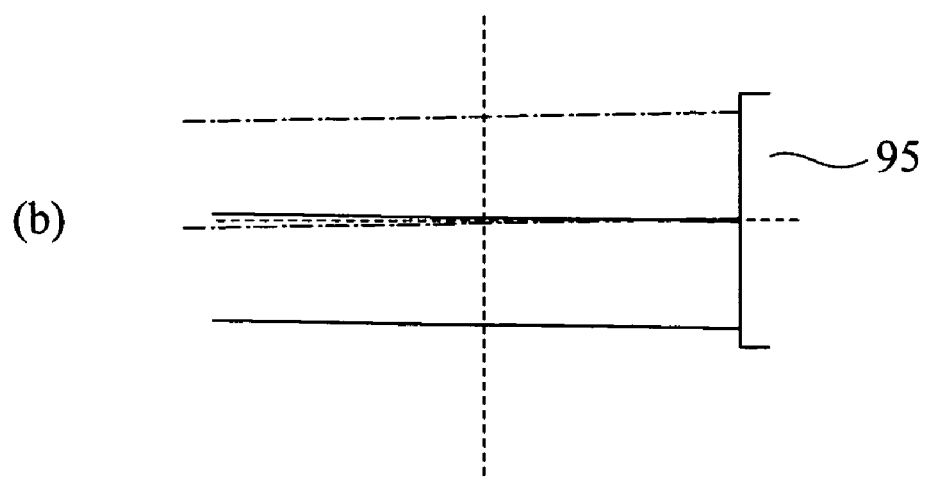

Because the light from the input port p1 side is split into ordinary light and extraordinary light in the birefringence crystal 5, the ordinary light and the extraordinary light are directed in at different angles at the optical sensor 9 as shown in FIGS. 5(*a*) and 5(*b*). In this case, in order to eliminate the polarization dependence of the conversion efficiency, an optical sensor 95 as large as possible should be provided as shown in FIG. 5(*b*). However, because the light beam can be converged by the focusing lens 10 shown in FIG. 5(*a*), the optical sensor 9 can be made relatively small.

For example, in a structure which does not have the focusing lens 10, when the size of the opening of the optical sensor 9 is 80 μm and the diameter of the light beam is 300 μm (1/e2), the conversion efficiency can only reach about 0.3 mA/W at 2% transmittance for the reflecting member 4. In contrast with this, the focusing lens 10 can constrict the light beam to 80 μm or smaller, whereby the conversion efficiency reaches 19 mA/W. Further, because 95% of the size of the light beam corresponds to a diameter of 600 μm which is approximately twice as large, the combining efficiency with the optical sensor 9 having an 80 μm-size opening only reaches 1.7%. In this regard, when the transmittance of the reflecting member 4 is 2%, this corresponds to 0.3%=3 mA/W.

In this way, the reflecting member 4 transmits a portion of the incident light to the rear side, and because the optical guide means guide this transmitted light to the optical sensor 9, the arrangement of the optical sensor 9 can be suitably set, and this makes it possible to arrange the optical sensor 9 at the position forming the rear side of the reflecting member 4. Namely, the structural element that carries out the light intensity monitoring function can be arranged without protruding in a side direction from the optical path, and this makes it possible to build a compact structure. Further, this structure is easily obtained by giving optical transmittance to the reflecting member 4 without changing the basic structure of an optical attenuator, and this makes it possible to construct an optical attenuator having a relatively simple structure at low cost.

The two Faraday rotators 7 and 8 are set so that the rotation directions of the polarization planes are opposite each other. Further, the variable Faraday rotator 8 carries out magnetic saturation by a fixed magnetic field fixed in a prescribed direction, adds a variable magnetic field which varies in a direction not aligned with the fixed magnetic field, and supplies an incline to magnetization by combining both magnetic fields.

Figure 6:
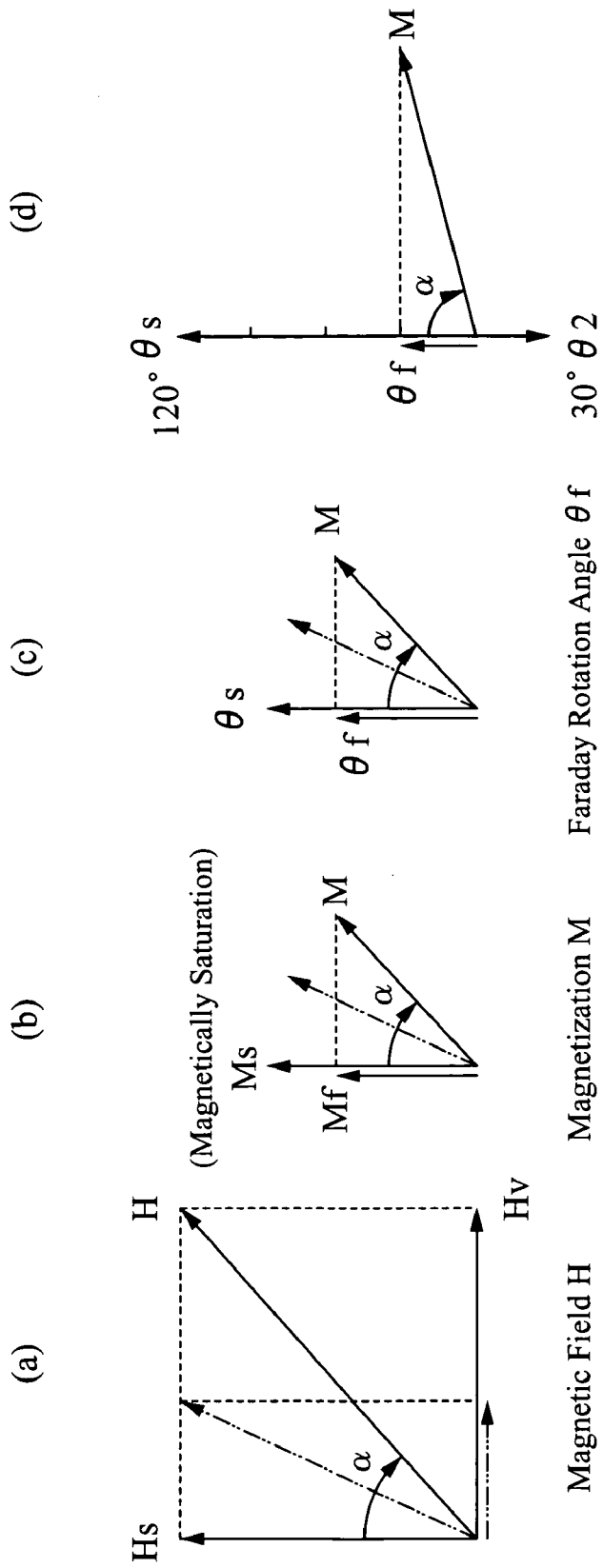
FIGS. 6(a)~6(d) are vector diagrams for describing the magnetization and the rotation angle in the variable Faraday rotator.

Specifically, with regard to the variable Faraday rotator 8, as shown in FIG. 6(*a*), a fixed magnetic field Hs in a prescribed direction is added, wherein the fixed magnetic field Hs is set to be sufficiently large to magnetically saturate the variable Faraday rotator 8, and a variable magnetic field Hv which varies in a direction orthogonal to the fixed magnetic field Hv is added. At this time, a magnetic field H having an inclination α formed by combining the fixed magnetic field Hs and the variable magnetic field Hv is operating in the variable Faraday rotator 8, and as shown in FIG. 6(*b*), the magnetization M becomes inclined corresponding to the magnetic field H having the inclination α. For this reason, a magnetization component Mf related to the Faraday rotation decreases, and this magnetization component Mf is given by the following:

$$Mf = Ms \times \cos \alpha$$

Because this corresponds to the rotation angle θf related to the Faraday rotation, the magnetization M without alteration can be substituted for the rotation angle θf as shown in FIG. 6(*c*), and the rotation angle θf related to the Faraday rotation is derived from the (maximum) rotation angle θs due to the fixed magnetic field Hs and the inclination α of the magnetization M as follows:

$$\theta f = \theta s \times \cos \alpha$$

In this case, the amount of optical intensity attenuation is a maximum under the following conditions:

$$\theta f = 0, 180, \ldots, n\pi \text{ (where } n \text{ is an integer)}$$

Further, the amount of attenuation is a minimum under the following conditions:

$$\theta f = 90, 270, \ldots, (2n+1)\pi/2 \text{ (where } n \text{ is an integer)}$$

Because the optical attenuator of the present embodiment is a reflection type attenuator, the incident light passes through the Faraday rotators two times. Accordingly, the rotation angle θf in this case is the total rotation angle for these two passes.

Because the rotation angle of the Faraday rotators depends on the wavelength, the rotation angle should be varied within the range 0~90° to minimize the wavelength dependency. In order to achieve this with a structure that uses only the variable Faraday rotator 8, the variable magnetic field shown in FIG. 6(*a*) must be made very large. However, in this case the rotation angle of the fixed Faraday rotator 7 is fixed at θ2 in the opposite direction with the variable side, and because this rotation angle θ2 of the fixed side is added, the rotation angle θf is given by the following:

$$\theta f = \theta s \times \cos \alpha - \theta 2$$

In this case, the range of θf is believed to vary as follows:

$$-\theta 2 < \theta f < \theta s - \theta 2$$

Accordingly, the amount of optical intensity attenuation will become a maximum when θs ×cos α=θ2, and can be made a minimum by suitably picking θs and θ2.

For example, in the case where θs=120° and θ2=30°, the magnetization M obtained by the maximum amount of attenuation is inclined as shown in FIG. 6(*d*), and this is given by the following:

$$\cos \alpha = 30/120$$

Figure 7:
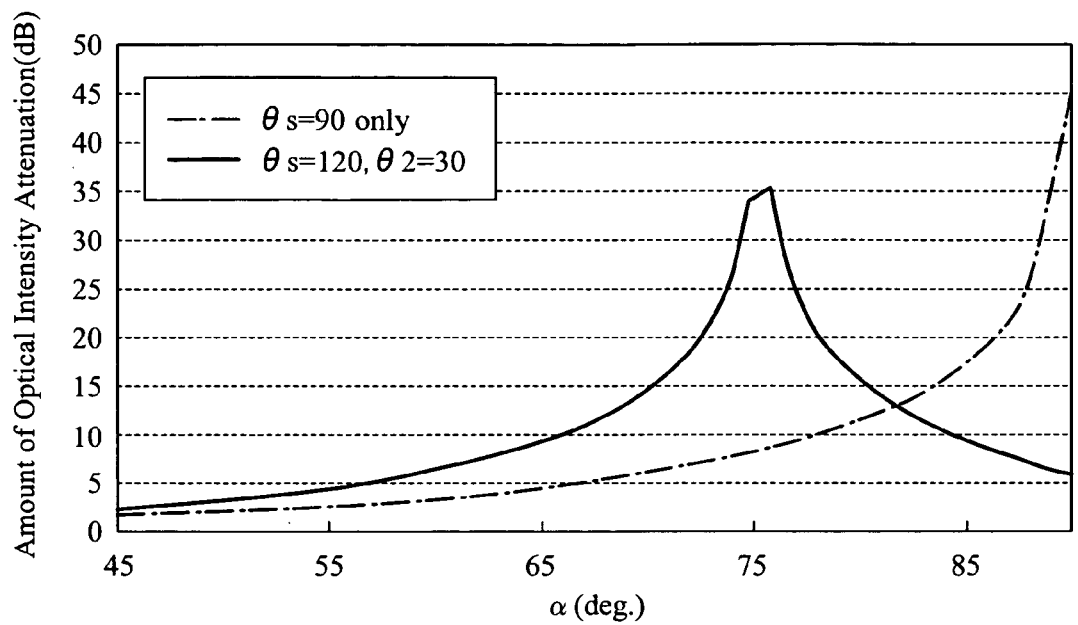
FIG. 7 is a graph showing the operation characteristics of the Faraday rotators.

Accordingly, as shown in FIG. 7, the amount of optical intensity attenuation becomes a maximum when the inclination α of the magnetization M becomes approximately 75.5°. FIG. 7 also shows the operation characteristics for θs=90° in the case where only the variable Faraday rotator 8 is used, and in this case it is not possible to obtain a large amount of attenuation without increasing the inclination α of the magnetization M, but because this makes the variable magnetic field Hv very large, the efficiency is poor.

In this way, the structure in which the two Faraday rotators 7 and 8 are combined to be respectively fixed and variable makes it possible to set θs larger than 90°, and the inclination α of the magnetization that obtains the same amount of attenuation can be made small, whereby a good efficiency is obtained.

Figure 8:
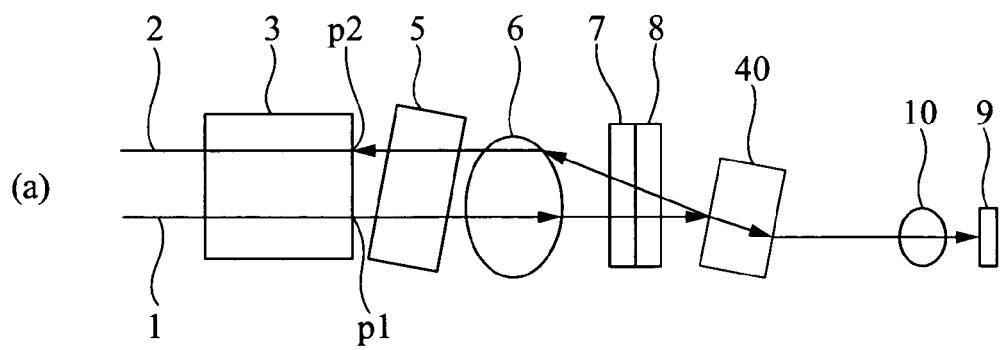
Figure 8:
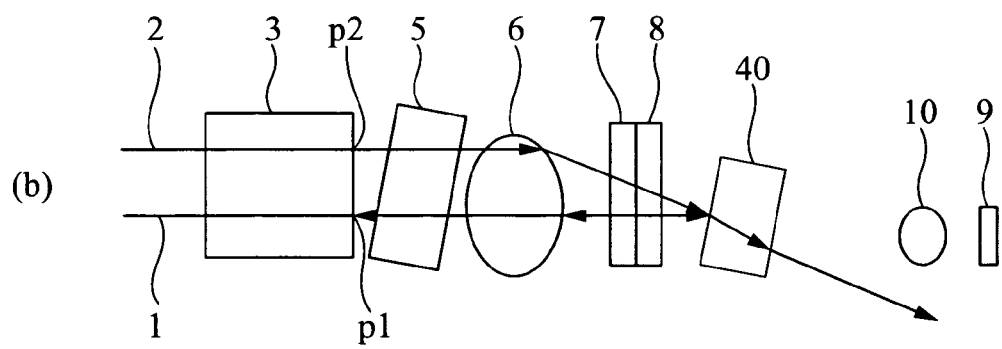

FIGS. 8(a) and 8(b) show a second embodiment of the present invention. In this second embodiment, there is an arrangement in which the axis of the converging lens 6 is roughly aligned with the optical axis of the input port p1. Further, the optical guide means is formed by an arrangement in which a reflecting member 40 having a rear surface roughly parallel to the reflecting surface is given an inclined posture with respect to the optical axis of the input port p1, wherein such inclined posture is set to direct the return light from the output port p2 side in an inclined direction with respect to the optical axis of the input port p1. Further, the optical sensor 9 is arranged at the position receiving the transmitted light from the input port p1 side. In this regard, the same reference characters will be used for the same structural elements as those in the first embodiment described above, and a description thereof is omitted.

The operation in this case is the same as that of the first embodiment, and as shown in FIG. 8(a), most of the incident light from the input port p1 is reflected by the reflecting member 40 and directed to the output port p2, but one portion of such light is transmitted through the reflecting member 40 and passes through the focusing lens 10 and is combined at the optical sensor 9. Accordingly, the light moving in the sequential directions from the input side to the output side is optically detected by the optical sensor 9.

On the other hand, as shown in FIG. 8(b), the return light from the output port p2 side is also reflected by the surface of the reflecting member 40, and most of the light beam is directed to the input port p1 side, but one portion of such return light is transmitted through the reflecting member 40. However, this transmitted return light is not combined at the optical sensor 9. Namely, because the return light from the output port p2 side has a different refraction direction at the time of emission due to the inclined posture of the reflecting member 40, it is impossible for the return light to be combined at the optical sensor 9.

In this embodiment, the reflecting member 40 transmits a portion of the incident light to the rear side, and because the optical guide means guide this transmitted light to the optical sensor 9, the optical sensor 9 is arranged at the rear side of the reflecting member 40, and this makes it possible to arrange the structural element that carries out the light intensity monitoring function without protruding in a side direction from the optical path, whereby it becomes possible to build a compact structure. Further, by giving optical transmittance to the reflecting member 40 without changing the basic structure of an optical attenuator, it becomes possible to construct an optical attenuator having a relatively simple structure at low cost.

As described above, in the optical attenuator according to the present invention, the reflecting member transmits a portion of the incident light to the rear side, and because the optical guide means guide this transmitted light to the optical sensor, it is possible to arrange the optical sensor at the rear side of the reflecting member. Namely, the structural element that carries out the light intensity monitoring function can be arranged without protruding in a side direction from the optical path, and this makes it possible to build a compact structure.

Further, this structure is easily obtained by giving optical transmittance to the reflecting member without changing the basic structure of an optical attenuator, and this makes it possible to construct an optical attenuator having a relatively simple structure at low cost.

What is claimed is:

1. An optical attenuator, comprising:
   an input port and an output port for optical signals arranged side by side;
   a reflecting member arranged to face both of said ports to reverse light from the input side on an optical path folded 180°;
   a birefringence crystal which splits incident light into two polarization components, a converging lens which converges the incident light, a fixed Faraday rotator having a fixed rotation angle, and a variable Faraday rotator having a variable rotation angle arranged in that order in said optical path;
   wherein said reflecting member is a partial reflecting member that transmits a portion of the incident light to the rear side thereof, an optical sensor is provided at the rear side of said reflecting member, optical guide means are provided to guide only the transmitted light from said input port side to said optical sensor, and optical detection signals of said optical sensor are used as optical input power monitoring signals.

2. The optical attenuator described in claim 1, wherein said optical guide means is formed by roughly aligning the axis of said converging lens with an imaginary axis lying between both optical axes of said input and output ports, forming the rear surface that forms the transmission surface of said reflecting member as an inclined surface, and setting the inclination angle of said inclined surface to direct the transmitted light from said input port side in a direction along said imaginary axis.

3. The optical attenuator described in claim 1, wherein the rear surface that forms the transmission surface of said reflecting member is parallel to the reflecting surface thereof, and said optical guide means is formed by roughly aligning the axis of said converging lens with the optical axis of said input port, arranging said reflecting member in an inclined posture with respect to the optical axis of said input port, and setting the inclination angle of said inclined posture to direct transmitted return light from said output port side in an inclined direction with respect to the optical axis of said input port.

4. The optical attenuator described in claim 1, wherein a focusing lens which converges the incident light for the purpose of focusing is provided in the optical path leading to said optical sensor.

5. The optical attenuator described in claim 2, wherein a focusing lens which converges the incident light for the purpose of focusing is provided in the optical path leading to said optical sensor.

6. The optical attenuator described in claim 3, wherein a focusing lens which converges the incident light for the purpose of focusing is provided in the optical path leading to said optical sensor.

7. The optical attenuator described in claim 1, wherein the thickness a of said birefringence crystal in said optical path and the focal length f of said converging lens obey the relation f>a.

8. The optical attenuator described in claim 3, wherein the thickness a of said birefringence crystal in said optical path and the focal length f of said converging lens obey the relation f>a.

9. The optical attenuator described in claim 3, wherein the thickness a of said birefringence crystal in said optical path and the focal length f of said converging lens obey the relation f>a.

10. The optical attenuator described in claim 4, wherein the thickness a of said birefringence crystal in said optical path and the focal length f of said converging lens obey the relation f>a.

11. The optical attenuator described in claim 5, wherein the thickness a of said birefringence crystal in said optical path and the focal length f of said converging lens obey the relation f>a.

12. The optical attenuator described in claim 6, wherein the thickness a of said birefringence crystal in said optical path and the focal length f of said converging lens obey the relation f>a.

* * * * *